April 18, 1961     D. ELLIOTT ET AL     2,980,270
AIRCRAFT CARRIER

Filed Jan. 7, 1958     2 Sheets-Sheet 1

April 18, 1961    D. ELLIOTT ET AL    2,980,270
AIRCRAFT CARRIER

Filed Jan. 7, 1958                   2 Sheets-Sheet 2

INVENTORS
DAVID ELLIOTT
*David Elliott*
ROY P. GIBBENS
*Roy P. Gibbens*

United States Patent Office 2,980,270
Patented Apr. 18, 1961

2,980,270
AIRCRAFT CARRIER
David Elliott and Roy P. Gibbens, Miami, Fla.; said Elliott assignor to Suzanne Elliott, Miami, Fla.
Filed Jan. 7, 1958, Ser. No. 707,508
6 Claims. (Cl. 214—85)

This invention relates to an improvement in aircraft carriers for the handling of large land based aircraft during such time as the airplane is on the ground, exclusive of the takeoff and landing roll. The principal object is to provide a carrier capable of transporting under its own power any large aircraft, particularly of the jet type. In practice the airplane will taxi onto the carrier after completion of the landing roll and thence be transported through all of the phases of unloading, servicing, and reloading and will remain on the carrier until ready to take off at the end of the runway.

The aircraft carrier is so equipped that it is possible to transport an aircraft about an airfield and from which carrier it can be serviced for fueling, starting, and performing any service necessary in the proper maintenance of an aircraft, and thereby eliminate the usual ground servicing vehicles and stations generally employed at airfields. Also, all offensive odors, noise and vibration caused by the jet engines and aircraft as it is moved about an airport can be overcome and eliminated.

The invention consists in providing an aircraft carrier with a main or central trackway for supporting the nose landing gear of an aircraft and along which the nose gear travels as the aircraft is taxied on and off the carrier. The trackway is supported on wheels at each end thereof and wheel supported outriggers are disposed on each side of the main trackway at one end thereof and arranged in spaced relation with respect to the main trackway. The outriggers are each provided with trackways for supporting the main landing gear of the aircraft.

Figure 1:
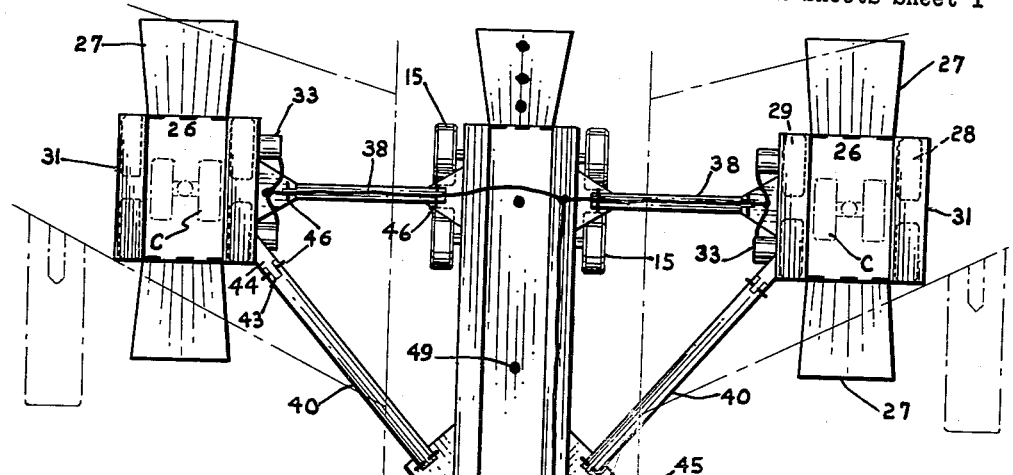
Figure 2:
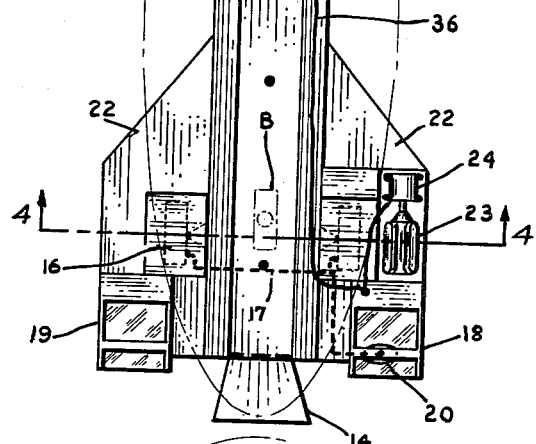
Figure 2:
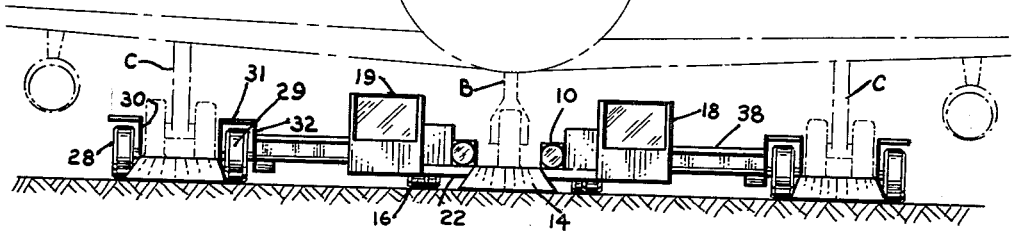
Figure 3:
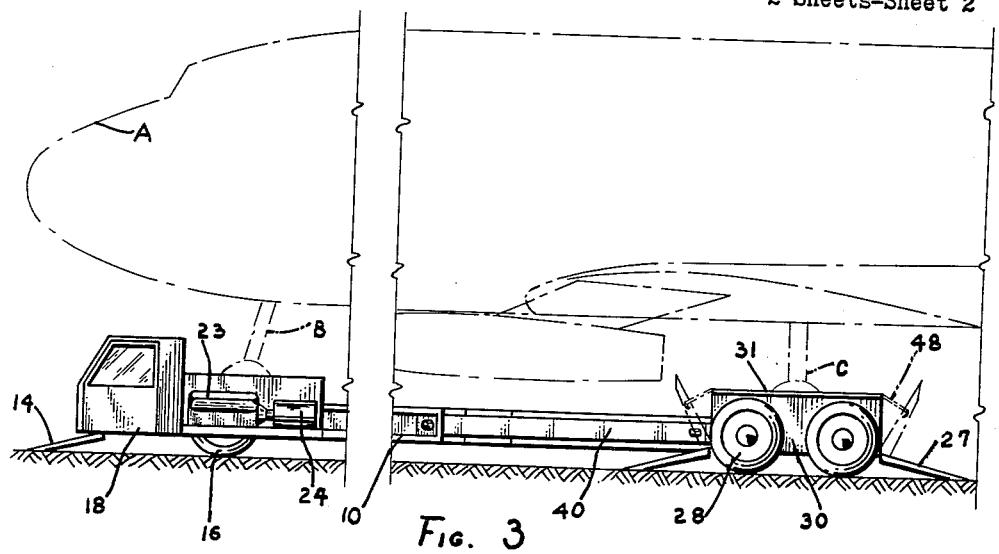
Figure 4:
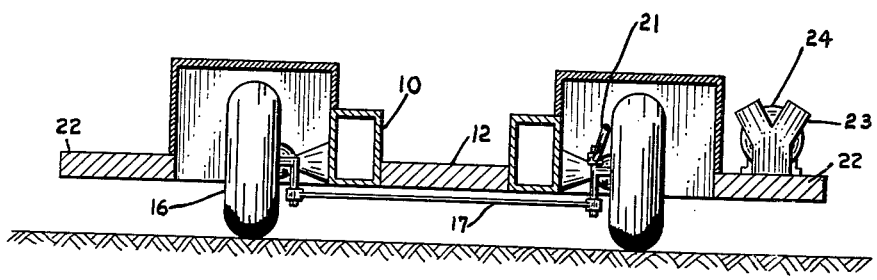
Figures 5, 6:
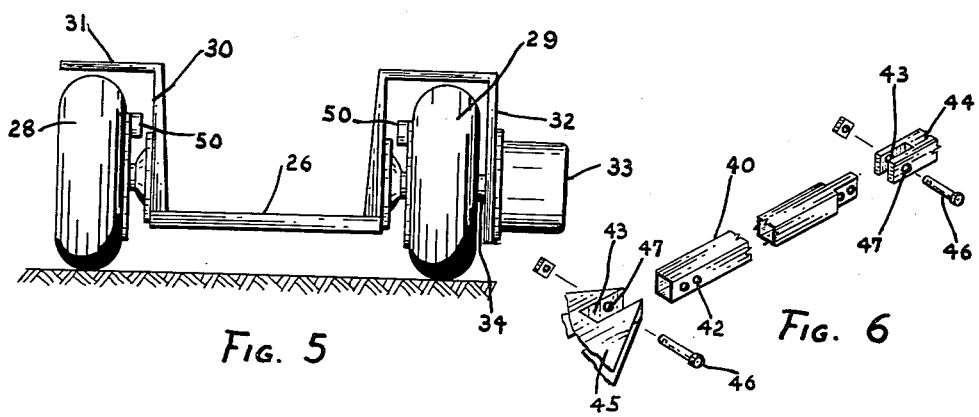

In the accompanying drawing:
Fig. 1 is a top plan view of the aircraft carrier with an aircraft shown in outline;
Fig. 2 is a view in front elevation;
Fig. 3 is a view in side elevation with an aircraft in outline;
Fig. 4 is a transverse vertical sectional view along line 4—4 of Fig. 1;
Fig. 5 is a view in rear elevation of one of the outriggers; and
Fig. 6 is a perspective view showing a beam unassembled.

The aircraft carrier is constructed to support the weight of an aircraft, which is partially represented by dotted lines A, and to accommodate the nose landing gear B and the main landing gears C. These gears are preferably of the retractable type, and are arranged and located on the aircraft with the main landing gears considerably in the rear of the nose landing gear which is located at the nose of the aircraft and laterally thereof, so that when the gears are in use the weight of the aircraft will be properly distributed.

The aircraft carrier has a main trackway composed of two parallel metal beams 10 and interposed therebetween and connected thereto is a metal plate 12 of suitable thickness and of a width sufficient to allow the nose landing gear B of an aircraft to be supported thereby and to travel throughout the length thereof. At each end of the trackway retractable ramps 14 are provided for the ingress and egress of the nose gear. Pneumatic tired wheels 15 are connected to the beams at the rear end of the trackway, and at the front end of the trackway similar steering wheels 16 are pivotally mounted to the beams. The wheels 16 are connected together by a suitable steering gear 17, Fig. 4.

The forward or front end of the trackway is provided on each side thereof with platforms 22 connected to the beams 10, and on which are cabins 18, 19 for the operator and personnel, while the necessary accessories for servicing the aircraft may be carried by the platforms 22. The steering gear 17 is operable by a steering wheel 20, dotted lines, in cabin 18 and connected to steering column 21, Fig. 4. Mounted on a platform 22 is an engine 23 for driving an electric generator 24.

Located along each side of the main trackway and at the rear end thereof are outriggers of adequate length but shorter than the main trackway for receiving and supporting the main landing gears C of an aircraft. The outriggers are spaced from each other and the main trackway a distance equal to and sufficient for the main landing gears to be supported by them. The outriggers are similarly constructed and each consists of a channel shaped metal track 26 supported on wheels 28 and 29 journaled to the outer sides of the vertical walls 30, Fig. 5. The vertical walls 30 have flanges 31 which overlie the wheels 28 and 29 and one of the flanges 31 has a downwardly extending end wall 32 located adjacent the inner wheels 29 upon which reversible electric motors 33 are mounted and which have driving connection with the axles 34 of the inner wheels 29. The motors 33 are connected to the generator 24 by suitable wiring 36 for supplying current for propelling the aircraft carrier.

The end walls 32 of each of the outriggers is pivotally connected to an adjacent beam 10 of the main trackway by a girder 38 to maintain the outriggers spaced from the main trackway. The pivotal connection between the girders 38 and beams 10 and end wall 31 allows for vertical oscillating movement of the outriggers with respect to the main trackway to allow for any uneven contour of the airport or landing field and allows for wing flexing of the aircraft to overcome injury to aircraft and damaging the fuel tanks.

Extending forwardly and obliquely from the end walls 31 of the outriggers are beams 40, which are pivotally connected to the end walls 31 and to the respective beams 10 of the trackway. As illustrated in Fig. 6 the beams 40 are provided with a plurality of holes 42 at each end, and the ends of the beam are received in sockets 43 of brackets 44 connected to the sides of the beams or main trackway and similar brackets 45 on the end walls 32 of the outriggers. Pins 46 extend horizontally through the holes 42 of the beams 40 and registering holes 47 in the brackets 44 and 45 for pivotally and adjustably connecting the outriggers to the main trackway. This arrangement allows for adjustment between outriggers and main trackway and allows the outriggers to have a vertical oscillating movement with respect to the main trackway. The girders 38 are similarly attached to the end walls 31 and beams 10 and the showing in Fig. 6 is deemed adequate.

The main trackway with the laterally disposed outriggers at the rear end of the main trackway are all connected together by girders 38 and beams 40 providing a rigid T-shaped construction and provides a support and passageway for the nose gear of the aircraft.

When power is applied to the wheels 29 of the outriggers, upon energizing the motors 34, the aircraft carrier may be propelled for transporting an aircraft about an airfield or airport and from the point of landing to the take off position. An aircraft on landing at an airport will be taxied onto the aircraft carrier, with the nose landing gear wheels B traveling up the ramp 14 and onto the main trackway and continuing therealong until the main landing gear wheels C have moved up the ramps 27 of the outriggers and onto the outrigger tracks 26, whereupon the aircraft power is cut off and the ramps 14 and 27 swing upwardly and held by latches 48 to serve as chocks for the landing gear wheels. Fig. 5 shows brakes 50 which may be used and operated by any suitable mechanism.

From the foregoing it will be apparent that with the aircraft carrier of the present invention a carrier is provided for transporting aircraft about an airport and wherein all servicing of the aircraft can be conducted from various equipment provided in the cabins 18 and 19, and at less expense in taxiing an aircraft about an airport to receive the necessary servicing. Again, towing is eliminated which is not feasible because of the excessive strain on the nose wheel of the aircraft due to the great weight of the aircraft and particularly under adverse condition such as a snow covered airfield.

It will be noted that in a carrier of this character that the main trackway must be of a length at least equal to the overall length from the nose landing gear to and including the main landing gears of an aircraft that in taxiing an aircraft onto the carrier the nose gear must travel substantially the entire length of the trackway so that the main landing gears can be moved onto the outriggers. Also that the width of the main trackway and outriggers is adequate to accommodate them. The carrier should have a ground clearance sufficient to permit the carrier to travel in snow, for example about seven inches, and to afford better access in inspecting and servicing the aircraft.

We claim:

1. An aircraft carrier for transporting an aircraft having nose and main landing gears, said main landing gear being arranged in rear of and laterally of said nose gear, comprising an elongated main trackway supported at each end by wheels and being of a length at least equal to the overall distance from the nose landing gear to and including the main landing gear of the aircraft, and two wheeled outrigger tracks pivotally connected to said main trackway at one end thereof and disposed one on each side of said main trackway in parallel relation thereto, and means connected to each of said wheeled outrigger tracks and to said trackway intermediate its ends for adjustably positioning said wheeled outrigger tracks with respect to said trackway, said main trackway providing a support for said nose landing gear at the end thereof in advance of said outrigger tracks, and said outrigger tracks providing a support for said main landing gear, so that the greatest weight of the aircraft is supported by said outrigger tracks, and power means mounted on said outrigger tracks for propelling the wheels of said outrigger tracks and transmitting driving force to said main trackway.

2. An aircraft carrier for transporting an aircraft having nose and main landing gears, said main landing gear being arranged in rear of and laterally of said nose gear, comprising an elongated main trackway supported at each end by wheels and being of a length at least equal to the overall distance from the nose landing gear to and including the main landing gear of the aircraft, and two wheeled outrigger tracks disposed one on each side of said main trackway in parallel relation thereto spacing members interposed between said main trackway and outrigger tracks with respective ends of said members being pivotally connected to said trackway and tracks, for vertical oscillation of said outrigger tracks with respect to said main trackway, said main trackway providing a support for said nose landing gear at the end thereof in advance of said outrigger tracks, and said outrigger tracks providing a support for said main landing gear, so that the greatest weight of the aircraft is supported by said outrigger tracks, power means mounted on said outrigger tracks for operatively propelling the wheels of said outrigger tracks and transmitting driving force to said main trackway, and ramps connected to opposite ends of said main trackway and said outrigger tracks for taxiing ingress and egress of an airplane onto and from the carrier.

3. A carrier for transporting an aircraft having nose and main landing gears with said main landing gear being arranged rearwardly and laterally of said nose gear, comprising an elongated trackway of a length equal at least to the overall distance from the nose landing gear to and including the main landing gear, a ramp pivotally mounted to said trackway at each end thereof, a plurality of supporting wheels connected to one end of said track, a pair of wheels pivotally mounted on opposite sides of the trackway at the other end for steering said trackway, a wheeled outrigger track positioned on each side of said trackway in spaced parallel relation thereto with the wheels of the outrigger tracks and the trackway supporting wheels being disposed in a common vertical plane, a spacing member interposed between each outrigger track and said trackway with the ends of each of said spacing members pivotally connected to said trackway and outrigger track for allowing pivotal movement of the outrigger tracks with respect to the trackway, a plurality of elongated adjustable brace members pivotally connected at one end to each of said outrigger tracks and to said trackway intermediate its ends for adjustably connecting each wheeled outrigger track to said trackway, said trackway providing a support for said nose landing gear at the end thereof in advance of said outrigger tracks and said wheeled outrigger tracks providing a support for said main landing gear with the greatest weight of the aircraft being supported by said wheeled outrigger tracks, power means mounted on said wheeled outrigger tracks for operatively propelling the wheels of the outrigger tracks and said trackway.

4. A carrier for transporting an aircraft having nose and main landing gears with said main landing gear being arranged rearwardly and laterally of said nose gear, comprising an elongated trackway of a length equal at least to the overall distance from the nose landing gear to and including the main landing gear, a ramp pivotally mounted to said trackway at each end thereof, a plurality of supporting wheels connected to one end of said track, a pair of wheels pivotally mounted on opposite sides of the trackway at the other end for steering said trackway, a wheeled outrigger track positioned on each side of said trackway in spaced parallel relation thereto with the wheels of the outrigger tracks and the trackway supporting wheels being disposed in a common vertical plane, a ramp pivotally mounted at each end of each outrigger track, an elongatably adjustable spacing member interposed between each outrigger track and said trackway with the ends of each of said elongatably adjustable spacing members being pivotally connected to said trackway and outrigger track for allowing pivotal and adjustable movement of the outrigger tracks with respect to said trackway, a plurality of elongated adjustable brace members pivotally connected at one end to each of said outrigger tracks and to said trackway intermediate its ends for adjustably connecting each wheeled outrigger track to said trackway, said trackway providing a support for said nose landing gear at the end thereof in advance of said outrigger tracks and said wheeled outrigger tracks providing a support for said main landing gear with the greatest weight of the aircraft being supported by said wheeled outrigger tracks, power means mounted on said wheeled outrigger tracks for operatively propelling the wheels of the outrigger tracks and said trackway, and steering means carried by the forward end of said trackway for operating said steering wheels.

5. A carrier for transporting an aircraft having nose and main landing gears with said main landing gear being arranged rearwardly and laterally of said nose gear, comprising an elongated trackway of a length equal at least to the overall distance from the nose landing gear to and including the main landing gear, a ramp pivotally mounted to said trackway at each end thereof, a plurality of supporting wheels connected to one end of said trackway, a pair of wheels pivotally mounted on opposite sides of the trackway at the other end for steering said trackway, a wheeled outrigger track positioned at each side of the said trackway in spaced parallel relation therewith, a plurality of elongated adjustable brace members pivotally connected at one end to each of said outrigger tracks and to said trackway intermediate its ends for adjustably connecting each wheeled outrigger track to said trackway, said trackway providing a support for said nose landing gear at the end thereof in advance of said outrigger tracks and said wheeled outrigger tracks providing a support for said main landing gear with the greatest weight of the aircraft being supported by said wheeled outrigger tracks, power means mounted on said carrier for operatively propelling the wheels of the outrigger tracks and trackway.

6. A carrier for transporting an aircraft having nose and main landing gears with said main landing gear being arranged rearwardly and laterally of said nose gear, comprising an elongated trackway of a length equal at least to the overall distance from the nose landing gear to and including the main landing gear, a ramp pivotally mounted to said trackway at each end thereof, a plurality of supporting wheels connected to one end of said trackway, a pair of wheels pivotally mounted on opposite sides of the trackway at the other end for steering said trackway, a wheeled outrigger track positioned at each side of the said trackway in spaced parallel relation therewith, a spacing member interposed between an end portion of each outrigger track and an end of said trackway with the ends of each of said spacing members being pivotally connected to said end portion of the trackway and outrigger track for allowing pivotal movement of the outrigger tracks with respect to the trackway, a plurality of elongated adjustable brace members pivotally connected at the other end to each of said outrigger tracks and to said trackway intermediate its ends for adjustably connecting each wheeled outrigger track to said trackway, said trackway providing a support for said nose landing gear at the end thereof in advance of said elongated adjustable brace members and said wheeled outrigger tracks providing a support for said main landing gear with the greatest weight of the aircraft being supported by said wheeled outrigger tracks, power means mounted on said carrier for operatively propelling the wheels of said outrigger tracks and trackway.

References Cited in the file of this patent
UNITED STATES PATENTS

| | | |
|---|---|---|
| 1,780,370 | Tenney | Nov. 4, 1930 |
| 2,248,080 | Hathaway | July 8, 1941 |
| 2,427,802 | Merritt | Sept. 23, 1947 |
| 2,523,832 | Kunkel | Sept. 26, 1950 |
| 2,539,010 | Cox | Jan. 23, 1951 |
| 2,787,331 | LeTourneau et al. | Apr. 2, 1957 |
| 2,798,729 | Paul | July 9, 1957 |

UNITED STATES PATENT OFFICE
CERTIFICATE OF CORRECTION

Patent No. 2,980,270                  April 18, 1961

David Elliott et al.

It is hereby certified that error appears in the above numbered patent requiring correction and that the said Letters Patent should read as corrected below.

In the grant, lines 2 and 3, for "said Elliott assignor to Suzanne Elliott, of Miami, Florida," read -- said Elliott assignor of one-half to Suzanne Elliott, of Miami, Florida, --; line 12, for "Suzanne Elliott and Roy P. Gibbens, their heirs" read -- David Elliott, Roy P. Gibbens, and Suzanne Elliott, their heirs --; in the heading to the printed specification, lines 3 and 4, for "said Elliott assignor to Suzanne Elliott, Miami, Fla." read -- said Elliott assignor of one-half to Suzanne Elliott, Miami, Fla.

Signed and sealed this 9th day of January 1962.

(SEAL)
Attest:

ERNEST W. SWIDER

Attesting Officer

DAVID L. LADD
                                      Commissioner of Patents